United States Patent
Huang et al.

(10) Patent No.: US 11,361,110 B2
(45) Date of Patent: Jun. 14, 2022

(54) FILE VERIFICATION METHOD, FILE VERIFICATION SYSTEM AND FILE VERIFICATION SERVER

(71) Applicant: Acer Incorporated, New Taipei (TW)

(72) Inventors: Yung-Cheng Huang, New Taipei (TW); Shao-Nung Huang, New Taipei (TW)

(73) Assignee: Acer Incorporated, New Taipei (TW)

( * ) Notice: Subject to any disclaimer, the term of this patent is extended or adjusted under 35 U.S.C. 154(b) by 366 days.

(21) Appl. No.: 16/543,644

(22) Filed: Aug. 19, 2019

(65) Prior Publication Data
US 2020/0364373 A1 Nov. 19, 2020

(30) Foreign Application Priority Data

May 15, 2019 (TW) .................................. 108116661

(51) Int. Cl.
*G06F 21/64* (2013.01)
*G06F 16/901* (2019.01)
*H04L 9/06* (2006.01)

(52) U.S. Cl.
CPC .......... *G06F 21/64* (2013.01); *G06F 16/9027* (2019.01); *H04L 9/0637* (2013.01); *H04L 9/0643* (2013.01); *H04L 2209/38* (2013.01)

(58) Field of Classification Search
CPC .... G06F 21/64; G06F 16/9027; G06F 21/602; G06F 2221/2145; H04L 9/0637; H04L 9/0643; H04L 2209/38; H04L 9/3239
See application file for complete search history.

(56) References Cited

U.S. PATENT DOCUMENTS

| | | | |
|---|---|---|---|
| 2004/0111608 A1* | 6/2004 | Oom Temudo de Castro | ............. G06F 16/182 713/156 |
| 2005/0050332 A1* | 3/2005 | Serret-Avila | ....... H04N 1/32144 713/176 |
| 2005/0065943 A1* | 3/2005 | Miyata | .................... G06F 21/64 |

(Continued)

FOREIGN PATENT DOCUMENTS

| | | |
|---|---|---|
| CN | 103916455 | 7/2014 |
| TW | I648680 | 1/2019 |
| WO | 2018164695 | 9/2018 |

OTHER PUBLICATIONS

Wayne Vaughan, et al., "Chainpoint A scalable protocol for anchoring data in the blockchain and generating blockchain receipts." Github, Aug. 31, 2016, pp. 1-6.

(Continued)

*Primary Examiner* — Cheng-Feng Huang
(74) *Attorney, Agent, or Firm* — JCIPRNET (57) ABSTRACT

A file verification method, a file verification system and a file verification server are provided. The file verification method includes the following steps. A tree data structure is established according to a plurality of first hash values of a plurality of first electronic files. A first root hash value of the tree data structure is stored into a block of a blockchain. A verification data including block information of the block, one of the first hash values and at least one non-terminal hash value of the tree data structure is generated for one of the first electronic files. A second electronic file is verified according to the verification data.

16 Claims, 7 Drawing Sheets

(56) References Cited

U.S. PATENT DOCUMENTS

| | | | |
|---|---|---|---|
| 2016/0205118 A1* | 7/2016 | Kim | H04L 63/1425 |
| | | | 726/23 |
| 2016/0267474 A1* | 9/2016 | Lingham | G06Q 20/0655 |
| 2016/0342982 A1 | 11/2016 | Thomas et al. | |
| 2016/0379013 A1* | 12/2016 | Ganesan | H04L 63/0823 |
| | | | 713/176 |
| 2017/0075877 A1* | 3/2017 | Lepeltier | G06F 40/205 |
| 2017/0126702 A1* | 5/2017 | Krishnamurthy | H04L 63/123 |
| 2018/0101701 A1* | 4/2018 | Barinov | H04L 63/12 |
| 2018/0331832 A1* | 11/2018 | Pulsifer | H04L 9/0637 |
| 2019/0081793 A1* | 3/2019 | Martino | G06Q 20/065 |

OTHER PUBLICATIONS

"Search Report of Europe Counterpart Application", dated Feb. 20, 2020, p. 1-p. 11.

Ethereum Research, "Merkle tree formation with odd number of leaves," Jul. 25, 2018, pp. 1-2. Available at: https://ethresear.ch/t/merkle-tree-formation-with-odd-number-of-leaves/2681/3.

"Office Action of Europe Counterpart Application", dated Apr. 12, 2022, p. 1-p. 7.

* cited by examiner

FILE VERIFICATION METHOD, FILE VERIFICATION SYSTEM AND FILE VERIFICATION SERVER

CROSS-REFERENCE TO RELATED APPLICATION

This application claims the priority benefit of Taiwan application serial no. 108116661, filed on May 15, 2019. The entirety of the above-mentioned patent application is hereby incorporated by reference herein and made a part of this specification.

BACKGROUND

Technical Field

The disclosure relates to a file verification method, and particularly relates to a file verification method, a file verification system and a file verification server applying a blockchain technique.

Description of Related Art

Electronic files have a risk of being easily tampered with and deleted without being detected. Therefore, a concept of storing the electronic files in a blockchain has been proposed to prevent data from being tampered with. The blockchain technique is composed of cryptography, mathematics, algorithms and economic models, and combines a point-to-point network relationship and adopts a distributed consensus algorithm to solve a synchronization problem of a conventional distributed database, which is a major breakthrough in integrating cross-domain technologies in modern times. Information recorded in the blockchain is not easily forged or cannot be tampered with.

However, a block storage space of each block on the blockchain is limited. If the huge file data is split and written into multiple blocks, it is a waste of storage resources and computing resources, which leads to a high cost and impracticability. Therefore, how to make use of the characteristics of the blockchain to ensure data security is an issue of concern to people of the field.

SUMMARY

Therefore, the disclosure is directed to a file verification method, a file verification system and a file verification server, which are adapted to verify correctness of an electronic file in a low cost and high security manner.

The disclosure provides a file verification method, which includes following steps. A tree data structure is established according to a plurality of first hash values of a plurality of first electronic files. A first root hash value of the tree data structure is stored into a block of a blockchain. A verification data including block information of the block, one of the first hash values and at least one non-terminal hash value of the tree data structure is generated for one of the first electronic files. A second electronic file is verified according to the verification data.

The disclosure provides a file verification system including a memory, a communication interface, one or a plurality of processors. The memory is configured to store data, and the communication interface is configured to connect a blockchain platform. The processor is coupled to the memory and the communication interface, and is configured to: establish a tree data structure according to a plurality of first hash values of a plurality of first electronic files; store a first root hash value of the tree data structure into a block of a blockchain; generate a verification data including block information of the block, one of the first hash values and at least one non-terminal hash value of the tree data structure for one of the first electronic files; and verify a second electronic file according to the verification data.

The invention provides a file verification server including a memory, a communication interface and a processor. The memory is configured to store data, and the communication interface is configured to connect a blockchain platform. The processor is coupled to the memory and the communication interface, and is configured to: establish a tree data structure according to a plurality of first hash values of a plurality of first electronic files; store a first root hash value of the tree data structure into a block of a blockchain; generate a verification data including block information of the block, one of the first hash values and at least one non-terminal hash value of the tree data structure for one of the first electronic files.

Based on the above description, in the embodiment of the disclosure, the tree data structure is established according to a plurality of first hash values of a plurality of first electronic files, and the first root hash value corresponding to the first electronic files is stored in the blockchain to ensure that the first root hash value is not tampered with. Moreover, the verification data respectively corresponding to the first electronic files is also generated based on the tree data structure, so as to verify correctness of a second electronic file according to the generated verification data and the first root hash value recorded in the blockchain, and accordingly determine whether the second electronic file is a forged file generated by tampering with one of the first electronic files.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts. Theses exemplary embodiments are only a part of the disclosure, and the disclosure does not disclose all of the implementations. More precisely, these exemplary embodiments are only examples of the system and method in the claims of the disclosure.

Figure 1:
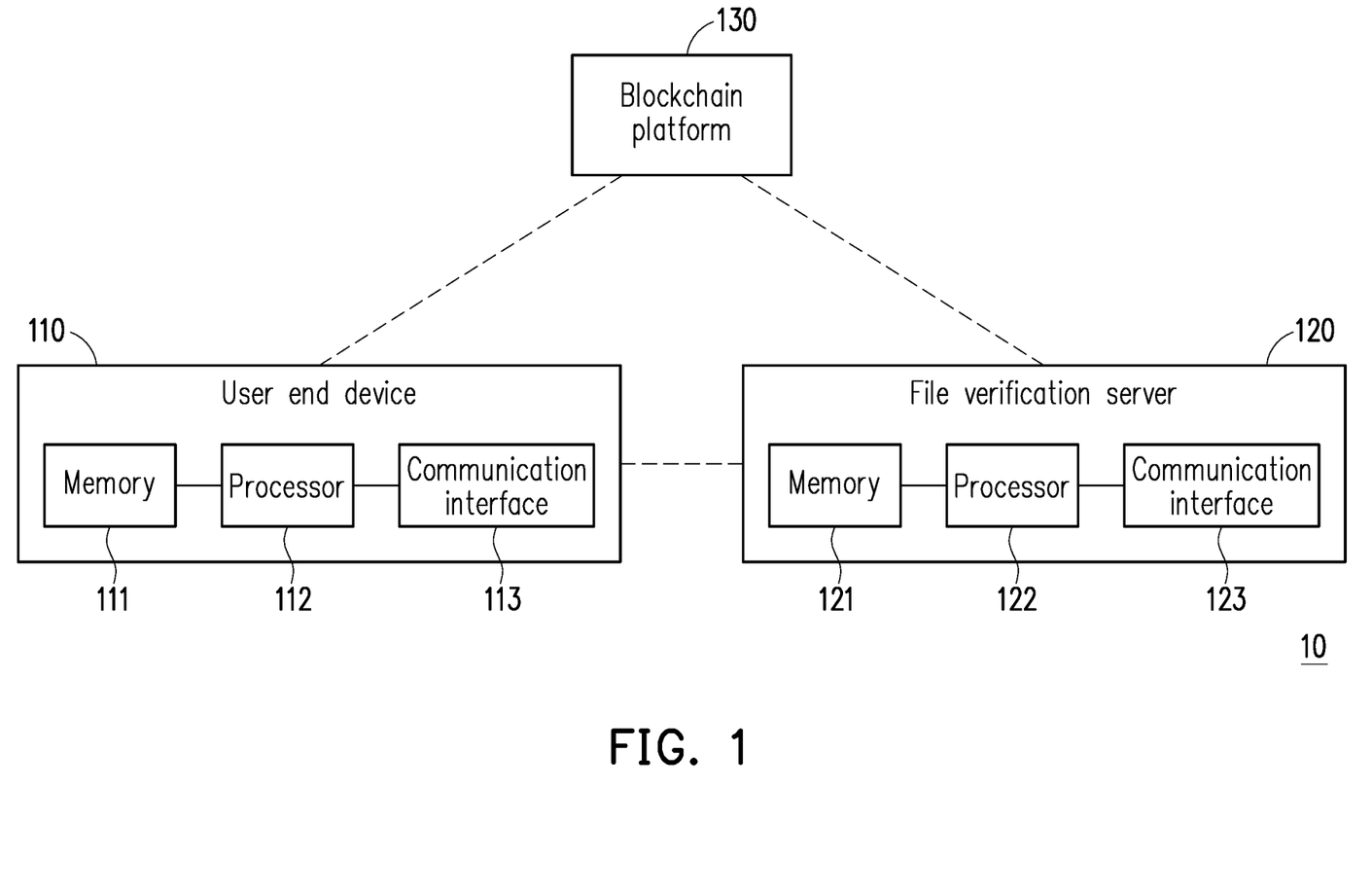
FIG. 1 is a schematic diagram of a file verification system according to an embodiment of the invention.

FIG. 1 is a schematic diagram of a file verification system according to an embodiment of the invention. First, FIG. 1 introduces all components and configuration relationships of the system, and detailed functions thereof are disclosed with reference of FIG. 2.

Referring to FIG. 1, the file verification system 10 includes a user end device 110, a file verification server 120 and a blockchain platform 130. The user end device 110 includes a memory 111, a processor 112 and a communication interface 113, which is, for example, an electronic device having a storage ability, such as a personal computer, a notebook computer, a server computer, a tablet computer, a smart phone, etc. The file verification server 120 includes a memory 121, a processor 122 and a communication interface 123, and is adapted to provide a file verification service to a user of the user end device 110 through a network. In other words, the user end device 110 is connected to the file verification server 120 through the network, such that the user may use the file verification service provided by the file verification server 120.

The memories 111 and 121 are used for storing data file and software components, which may be any type of fixed or movable Random Access Memories (RAMs), Read-Only Memories (ROMs), flash memories, hard drives or other similar devices, integrated circuits or a combination thereof.

The communication interfaces 113 and 123 may be electronic components such as wireless network communication chips, antennas, etc., that support any wired or wireless communication standard, and are used for connecting the file verification server 120 and the user end device 110 with other devices or platforms through the network.

The processors 112 and 122 are respectively used for controlling operations of the components of the user end device 110 and the file verification server 120, and are adapted to execute the software components recorded by the memories 111 and 121, which are, for example, Central Processing Units (CPUs) or other programmable general purpose or special purpose microprocessors, Digital Signal Processors (DSPs), programmable controllers, Application Specific Integrated Circuits (ASICs), Programmable Logic Devices (PLDs) or other similar devices, integrated circuits or a combination thereof.

The blockchain platform 130 is connected to the user end device 110 and the file verification server 120 through the network. The blockchain platform 130 has a plurality of distributed computing node devices, and the computing node devices in the blockchain platform 130 are connected with each other through the network. The computing node devices in the blockchain platform 130 commonly maintain one blockchain, and such blockchain may be used for recording data that cannot be tampered with. The blockchain may be regarded as a decentralized database, which is maintained collectively by the computing node devices, thus making the data in block chains more reliable. For example, the blockchain platform 130 may be an Ethereum blockchain platform. In an embodiment, the user end device 110 or the file verification server 120 may transmit data to be stored to the blockchain platform 130, and the blockchain platform 130 records the received data to the blockchain according to a blockchain technique. Moreover, the user end device 110 and the file verification server 120 may also retrieve the data that cannot be tampered with from the blockchain according to a block index provided by the blockchain platform 130.

Figure 2:
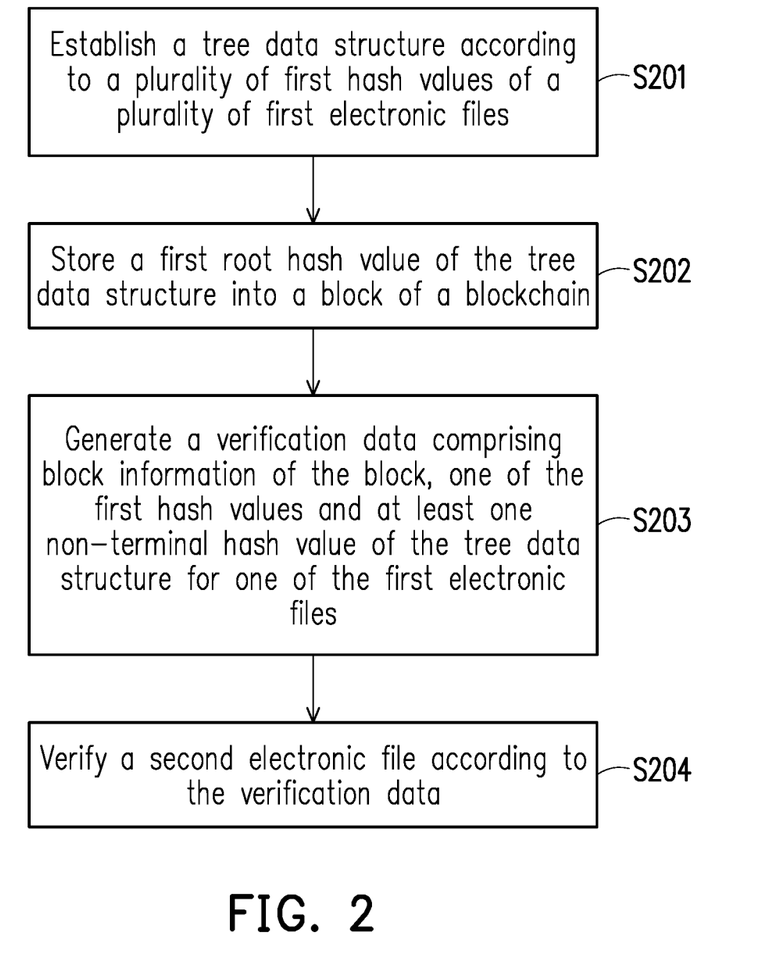
FIG. 2 is a flowchart illustrating a file verification method according to an embodiment of the invention.

FIG. 2 is a flowchart illustrating a file verification method according to an embodiment of the invention, and the flow of FIG. 2 is adapted to the file verification system 10 of FIG. 1, and the method of FIG. 2 is described below with reference of the embodiment of FIG. 1.

Referring to FIG. 1 and FIG. 2, in a step S201, the processor 122 of the file verification server 120 establishes a tree data structure according to a plurality of first hash values of a plurality of first electronic files. In detail, the file verification server 120 may collect the first hash value of each of the first electronic files. The first electronic files may be document files, an image files, sound files or video files, etc., and the type of the first electronic files is not limited by the invention. The first electronic files may be stored in the user end device 110 and other user end devices connected to the file verification server 120. Alternatively, the first electronic files may also be stored in a cloud database.

The first hash values may be generated by performing a hash processing on the first electronic files. The hash processing is a data one-way conversion operation for converting the first electronic file into a string composed of letters and numbers according to a hash algorithm, and the hash algorithm may be a Message-Digest Algorithm 5 (MD5), a Secure Hash Algorithm-1 (SHA1) or a Secure Hash Algorithm-256 (SHA256), etc. In the embodiment of the invention, the first hash values may be generated by the user end device 110, the file verification server 120 or other online tool providing device, which is not limited by the invention. After the file verification server 120 collects or generates a plurality of the first hash values of the plurality of first electronic files, the file verification server 120 establishes a tree data structure according to the first hash values. The tree data structure may be a Merkle tree of a binary structure, or a tree data structure established according to other rules. To be specific, the file verification server 120 takes the first hash values as leaf nodes in the tree data structure, and generates non-terminal nodes located at intermediate layers by repeatedly executing the hash processing, and finally generates a root node located at a top layer, thereby establishing a complete tree data structure. In other words, the leaf nodes, the non-terminal nodes and the root node in the tree data structure are all hash values generated based on the hash processing.

In a step S202, the processor 122 of the file verification server 120 stores a first root hash value of the tree data structure into a block of a blockchain. In detail, the file verification server 120 uploads the first root hash value to the blockchain platform 130, and the blockchain platform 130 generates a block according to the received first root has value, and connects the block to the blockchain. Moreover, after storing the first root hash value into the block of the blockchain, the blockchain platform 130 transmits block information of the block recording the first root hash value to the file verification server 120. The block information may include a block height, a transaction ID, a time stamp, etc.

Then, in a step S203, the processor 122 of the file verification server 120 generates a verification data including the block information of the block, one of the first hash values and at least one first non-terminal hash value of the tree data structure for one of the first electronic files. To be specific, after the block information is obtained, the file verification server 120 may generate the corresponding verification data for each of the first electronic files. In order to calculate a second root hash value used as a verification credential at a verification phase, the verification data of each of the first electronic files requires to include one of the first hash values and the at least one first non-terminal hash value of the tree data structure.

Figure 3:
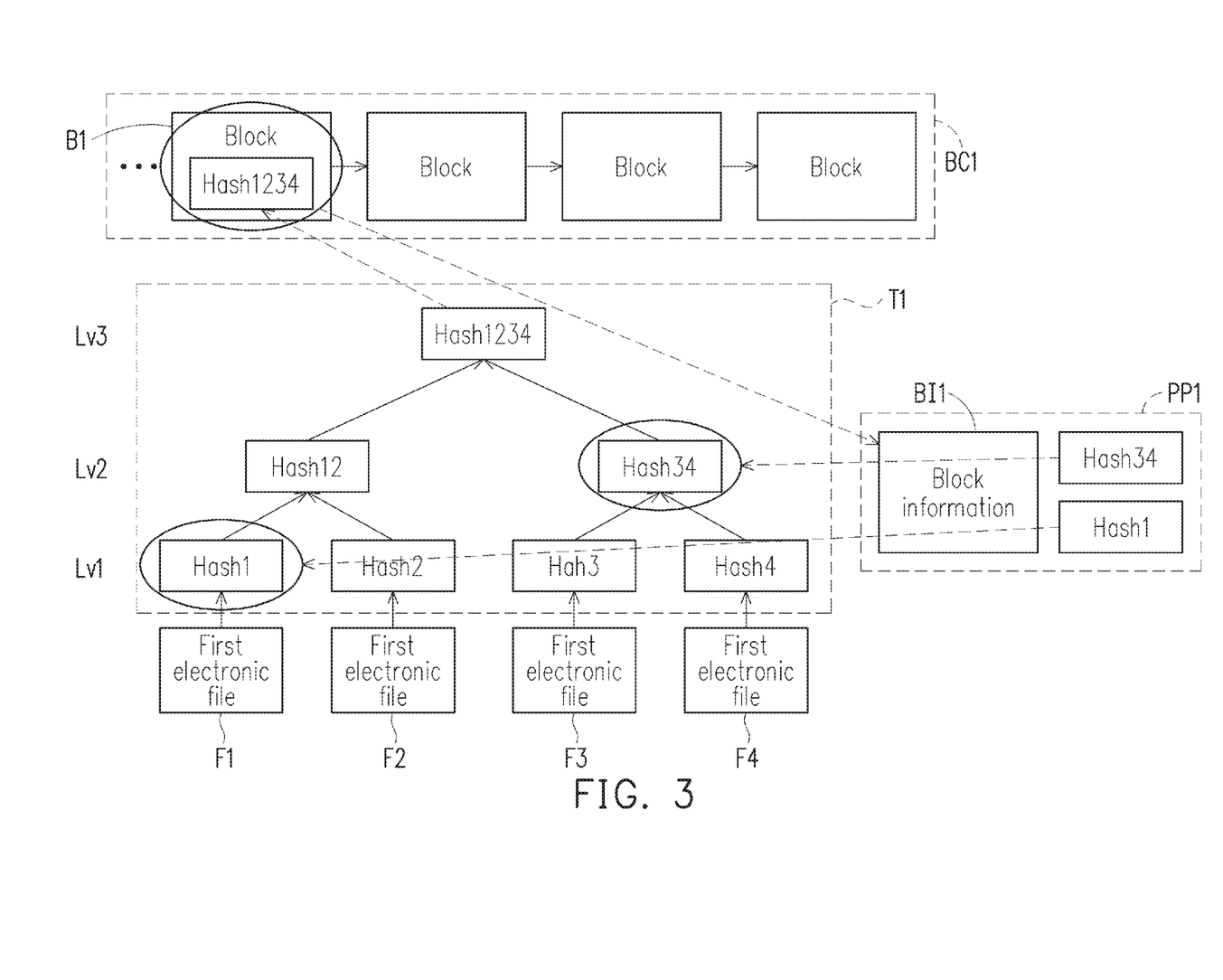
FIG. 3 is a schematic diagram of generating verification data according to an embodiment of the invention.

For example, in FIG. 3, the tree data structure is, for example, a Merkle tree of a binary structure. FIG. 3 is a schematic diagram of generating the verification data according to an embodiment of the invention. Referring to FIG. 3, after performing the hash processing to the first electronic files F1-F4, the file verification server 120 may obtain the first hash values Hash1, Hash2, Hash3 and Hash 4 of the first electronic files F1-F4 to accordingly establish a tree data structure T1.

The tree data structure T1 includes the first hash values Hash1, Hash2, Hash3 and Hash 4 serving as leaf nodes, first non-terminal hash values Hash12 and Hash34 serving as non-terminal node, and a first root hash value Hash1234 serving as a root node. The first non-terminal hash value Hash12 is generated by performing hash processing to a string generated by concatenating the first hash values Hash1 and Hash2. The first non-terminal hash value Hash34 is generated by performing hash processing to a string generated by concatenating the first hash values Hash3 and Hash4. The first root hash value Hash1234 is generated by performing hash processing to a string generated by concatenating the first non-terminal hash values Hash12 and Hash34. The first root hash value Hash1234 is at a top layer Lv3 of the tree data structure T1; the first non-terminal hash values Hash12 and Hash34 are located at an intermediate layer Lv2 of the tree data structure T1; and the first hash values Hash1, Hash2, Hash3 and Hash 4 are located at a bottom layer Lv1 of the tree data structure T1.

After generating the first root hash value Hash1234 associated with the first electronic files F1-F4, the file verification server 120 stores the first root hash value Hash1234 to a block B1 of a blockchain BC1, and obtains block information BI1 of the block B1 from the blockchain platform 130.

Then, the file verification server 120 may respectively generate corresponding verification data for the first electronic files F1-F4 according to the block information BI1 and the hash values in the tree data structure T1. For example, when generating verification data PP1 for the first electronic file F2, the file verification server 120 may obtain the first hash value Hash1 of the first electronic file F1 adjacent to the first hash value Hash2 of the first electronic file F2 according to the structure of the tree data structure T1. Moreover, according to the structure of the tree data structure T1, the processor 122 of the file verification server 120 extracts at least one first non-terminal hash value Hash34 from each of the at least one intermediate layer Lv2 of the tree data structure T1. In this case, when the verification data is generated for the first electronic file F2, the extracted first non-terminal hash value Hash34 and the first hash value Hash2 of the first electronic file F2 are located on different branches of the tree data structure T1. Finally, the file verification server 120 may combine the first hash value Hash1, the first non-terminal hash value Hash34 and the block information BI1 to generate the verification data PP1 of the first electronic file F2. Similarly, verification data of the other first electronic files F1, F3 and F4 may also generated according to the same manner. Based on the aforementioned description, it is learned that each of the first electronic files F1-F4 has its own verification data, and the verification data are not all node data that store the entire tree data structure.

However, in FIG. 3, the four first electronic files F1-F4 and the tree data structure T1 having one layer of the intermediate layer L2 are taken as an example for description, but the number of the first electronic files and the number of the intermediate layers are not limited by the invention. It is known that in other implementations, the verification data may include more first non-terminal hash values.

Referring back to the flow of FIG. 2, finally, in a step S204, the processor 112 of the user end device 110 verifies a second electronic file according to the verification data. To be specific, when the user end device 110 wants to verify whether the content of the second electronic file is the same to the content of one of the first electronic files, the user end device 110 may calculate a second root hash value according to the hash values in the verification data and a second hash value of the second electronic file. Moreover, the user end device 110 may obtain the first root hash value recorded by the blockchain from the blockchain platform 130 according to the block information in the verification data. In this way, by comparing the first root hash value and the second root hash value, the user end device 110 may determine whether the second electronic file passes the verification. If the second electronic file is generated by tampered with the firsts electronic file, the second root hash value is different to the first hash value recorded in the blockchain.

However, it should be noted that the step S204 may also be executed by the processor 122 of the file verification server 120. Namely, in case the verification data generated by the file verification server 120 is obtained, verification of the second electronic file may be executed by the user end device 110, the file verification server 120 or other device, which is not limited by the invention.

It should be noted that in an embodiment of the invention, the first electronic files may also be encrypted first, and the first hash values are generated by performing hash processing to the encrypted first electronic files. In this way, the confidentiality of the first electronic files may be ensured. Moreover, when the tree data structure is a binary tree data structure of a binary structure, if the number of the first electronic files is not equal to $2^n$ (n is a positive integer), i.e. the number of the first hash values is not equal to $2^n$, the file verification server 120 establishes the binary tree data structure according to the first hash value of the first electronic file and at least one redundant complement value. Referring to FIG. 3, it is assumed that the first electronic file F4 does not exist, the file verification server 120 requires to set a redundant complement value to compensate for the non-existed first hash value Hash4, thereby establishing the binary tree data structure. The redundant complement value is, for example, a predetermined string composed of numbers and/or letters.

Moreover, in an embodiment of the invention, the first electronic files may be respectively stored in a plurality of user end devices, and the file verification server 120 may collect the plurality of first hash values within a predetermined time interval (for example, 12 hours, 24 hours, etc.). In other words, the file verification server 120 may establish a tree data structure according to the collected first hash values every predetermined time interval. Then, the file verification server 120 may send the verification data to the user end device, such that the user end device may verify the second electronic file according to the verification data.

Figure 4:
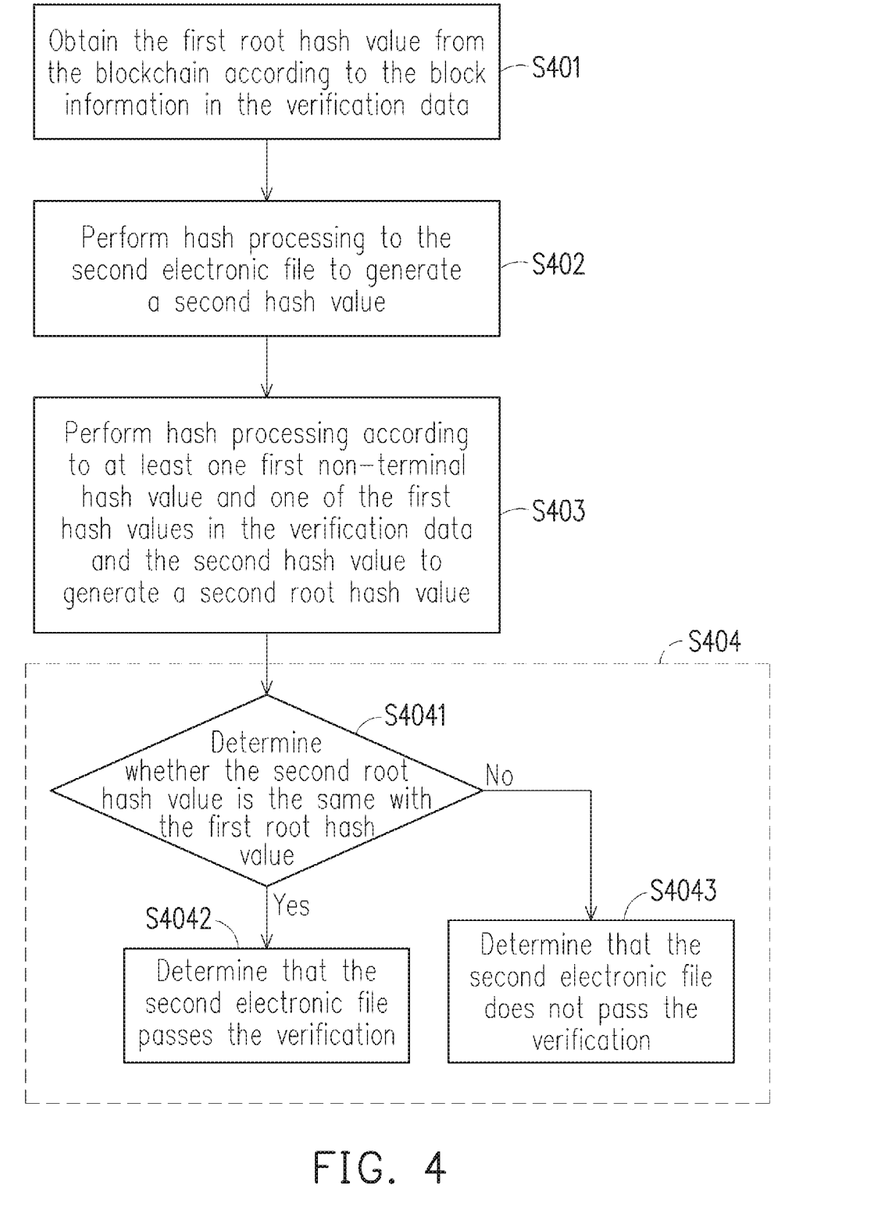
FIG. 4 is a detailed flowchart of a method for verifying a second electronic file according to an embodiment of the invention

Details of the user end device 110 verifying the second electronic file are described below. FIG. 4 is a detailed flowchart of a method for verifying the second electronic file according to an embodiment of the invention, and the flow of FIG. 4 is adapted to the file verification system 10 of FIG. 1, and the method of FIG. 4 is described below with reference of the embodiment of FIG. 1.

Referring to FIG. 1 to FIG. 4, in a step S401, the processor 112 of the user end device 110 obtains the first root hash value from the blockchain according to the block information in the verification data. To be specific, the user end device 110 may download the verification data from the file verification server 120, and inquire the blockchain according to the block information in the verification data to obtain the first root hash value that cannot be tampered with. In a step S402, the processor 112 of the user end device 110 performs hash processing to the second electronic file to generate a second hash value. The second electronic file to be verified is probably the original first electronic file, or is probably a forged file generated by intentionally tampering with the first electronic file by a person of intention. The user end device 110 may use an online public tool to perform the hash processing to the second electronic file to generate the second hash value of the second electronic file.

Then, in a step S403, the processor 112 of the user end device 110 performs hash processing according to at least one first non-terminal hash value in the verification data, one of the first hash values and the second hash value to generate a second root hash value. To be specific, the user end device 110 generates the second root hash value according to the hash values corresponding to different data structure layers in the verification data and the second harsh value of the second electronic file. In detail, the processor 112 of the user end device 110 serially concatenates the second hash value of the second electronic file with the first hash value in the verification data to generate a first string, and performs hash processing to the first string to generate a second non-terminal hash value. Then, the processor 112 of the user end device 110 serially concatenates at least one first non-terminal hash value in the verification data with the second non-terminal hash value to produce a second string, and performs hash processing to the second string to produce the second root hash value.

In a step S404, the processor 112 of the user end device 110 compares the second root hash value with the first root hash value stored in the blockchain to verify the second electronic file. It is learned that if the content of the second electronic file is different to the content of the first electronic file used for generating the verification data, the second root hash value is different to the first root hash value stored in the blockchain.

In detail, in a sub-step S4041, the processor 112 of the user end device 110 determines whether the second root hash value is the same with the first root hash value. If yes, in a sub-step S4042, the processor 112 of the user end device 110 determines that the second electronic file passes the verification. In other words, if the second root hash value is the same with the first root hash value, it represents that the content of the second electronic file is the same with the content of the original first electronic file, and the user end device 110 determines that the second electronic file is correct and passes the verification. If not, in a sub-step S4043, the processor 112 of the user end device 110 determines that the second electronic file does not pass the verification. In other words, if the second root hash value is different to the first root hash value, it represents that the content of the second electronic file is generated by tampering with the content of the first electronic file, and the user end device 110 determines that the second electronic file is incorrect and does not pass the verification.

Figure 5:
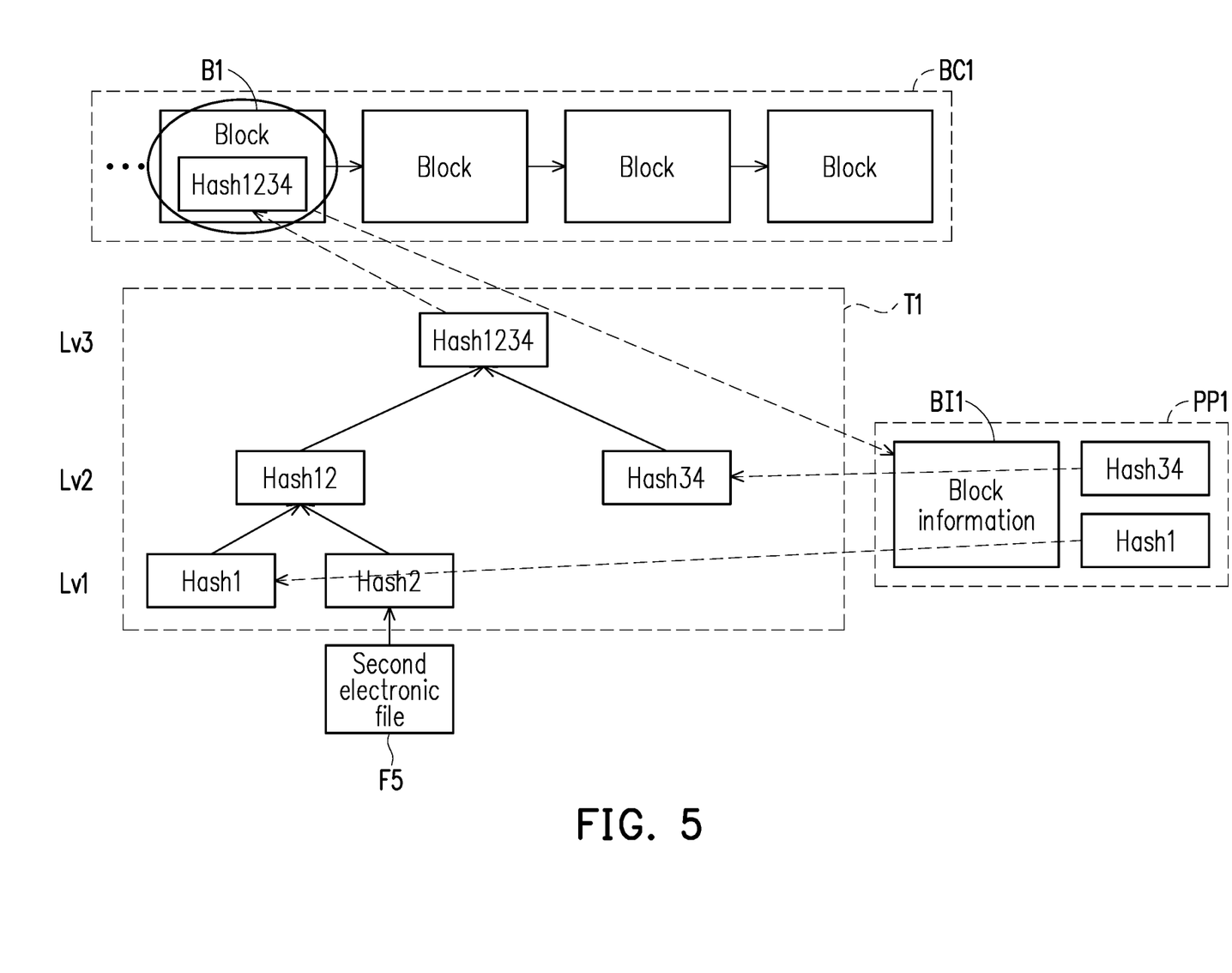
FIG. 5 is a schematic diagram of verifying the second electronic file according to an embodiment of the invention.

FIG. 5 is a schematic diagram of verifying the second electronic file according to an embodiment of the invention. The verification operation of FIG. 5 corresponds to the embodiment of FIG. 3. It should be noted that in the case of FIG. 5, it is assumed that the second electronic file F5 is correct, i.e. the content of the second electronic file F5 is the same with the content of the first electronic file F2 shown in FIG. 3. When the user end device 110 wants to verify whether the second electronic file F5 is correct, the user end device 110 performs hash processing to the second electronic file F5 to generate a second hash value Hash2. Then, the user end device 110 retrieves the first hash value Hash1 from the verification data PP1, and serially concatenates the first hash value Hash1 with the second hash value Hash2 to generate a first string, and performs hash processing to the first string to generate a second non-terminal hash value Hash12. Then, the processor 112 of the user end device 110 serially concatenates at least one first non-terminal hash value Hash34 in the verification data with the second non-terminal hash value Hash12 to produce a second string, and performs hash processing to the second string to produce the second root hash value Hash1234. Since the second electronic file F5 is correct, the second hash value Hash1234 generated according to the verification data PP1 in the verification phase is the same as the first hash value Hash1234 stored in the blockchain BC1. Therefore, the user end device 110 may determine that the second electronic file F5 is correct and passes the verification.

Figure 6:
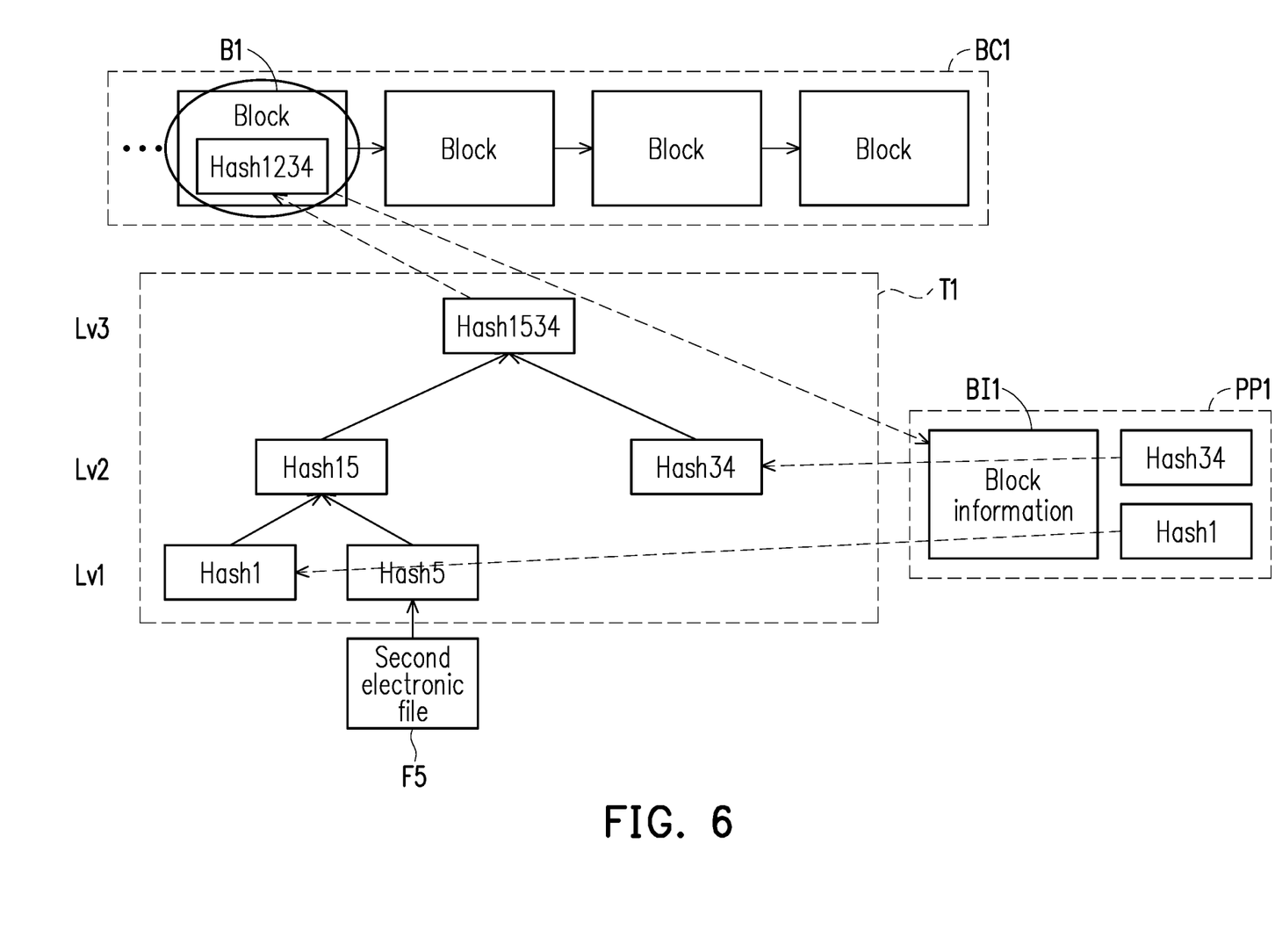
FIG. 6 is a schematic diagram of verifying the second electronic file according to an embodiment of the invention.

FIG. 6 is a schematic diagram of verifying the second electronic file according to an embodiment of the invention. The verification operation of FIG. 6 corresponds to the embodiment of FIG. 3. It should be noted that in the case of FIG. 6, it is assumed that the second electronic file F5 is generated by tampering with the first electronic file F2 shown in FIG. 3. When the user end device 110 wants to verify whether the second electronic file F5 is correct, the user end device 110 performs hash processing to the second electronic file F5 to generate a second hash value Hash5. Then, the user end device 110 performs hash processing according to the second hash value Hash5 and the first hash value Hash1 in the verification data PP1 and the first non-terminal hash value Hash34 to generate the second root hash value Hash1534. Since the second electronic file F5 is incorrect, the second hash value Hash1534 generated according to the verification data PP1 in the verification phase is different to the first hash value Hash1234 stored in the blockchain BC1. Therefore, the user end device 110 may determine that the second electronic file F5 is incorrect and does not pass the verification.

Figure 7:
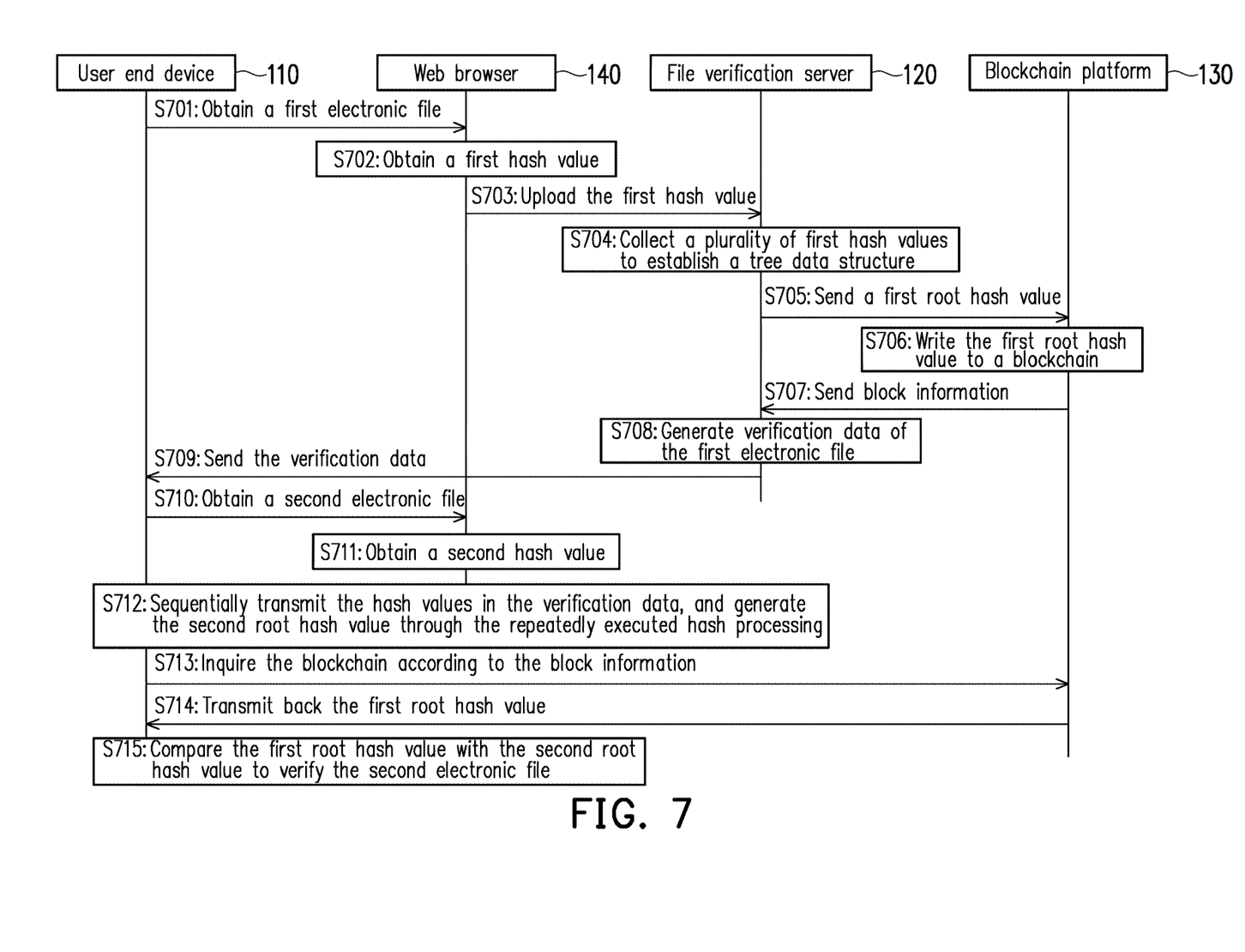
FIG. 7 is a flowchart illustrating a file verification method according to an embodiment of the invention.

FIG. 7 is a flowchart illustrating a file verification method according to an embodiment of the invention. Referring to FIG. 7, in a step S701, a web browser 140 obtains a first electronic file stored by the user end device 110. In a step S702, the web browser 140 uses an online public tool to perform the hash processing to the first electronic file to obtain a first hash value. In a step S703, the web browser 140 uploads the first hash value to the file verification server 120. In a step S704, the file verification server 120 establishes a tree data structure according to a plurality of first hash values collected within a predetermined time interval. In a step S705, the file verification server 120 sends the first root hash value of the tree data structure to the blockchain platform 130. In a step S706, the blockchain platform 130 writes the first root hash value into a block of the blockchain. In a step S707, the blockchain platform 130 sends block information of the block to the file verification server 120. In a step S708, the file verification server 120 generates verification data of the first electronic file according to the tree data structure and the block information. In a step S709, the file verification server 120 sends the verification data to the user end device 110 through the web browser 140.

In the verification phase, in a step S710, the web browser 140 obtains the second electronic file to be verified by the user end device 110. In a step S711, the web browser 140 uses the online public tool to perform the hash processing to the second electronic file to obtain a first hash value. In a step S712, the user end device 110 sequentially transmits the hash values in the verification data to the web browser 140, and generates the second root hash value through the repeatedly executed hash processing. In a step S713, the user end device 110 inquires the blockchain according to the block information. In a step S714, the user end device 110 retrieves the first root hash value from the blockchain platform 130. In a step S715, the user end device 110 compares the first hash value and the second hash value to verify the second electronic file.

In summary, in the embodiments of the invention, the root hash value corresponding to a plurality of electronic files is recorded in the blockchain, which may greatly save storage and operation resources needed to establish the blockchain, so as to reduce the cost. Therefore, when correctness of an electronic file is to be verified, the electronic file may be verified according to the root hash value obtained from the blockchain and the hash values in the stored tree data structure, so as to determine whether the electronic file has been tampered with. In this way, the invention may verify and ensure the correctness of the electronic file in a low cost and high security way.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:

1. A file verification method, comprising:
   establishing a tree data structure according to a plurality of first hash values of a plurality of first electronic files;
   storing a first root hash value of the tree data structure into a block of a blockchain;
   generating a verification data comprising block information of the block, one of the first hash values and at least one non-terminal hash value of the tree data structure for one of the first electronic files; and
   verifying a second electronic file according to the verification data,
   wherein the step of verifying the second electronic file according to the verification data comprises:
   performing hash processing to the second electronic file to generate a second hash value;
   performing hash processing according to the at least one first non-terminal hash value and one of the first hash values in the verification data and the second hash value to generate a second root hash value; and
   comparing the second root hash value with the first root hash value stored in the blockchain to verify the second electronic file,
   wherein the step of performing hash processing according to the at least one first non-terminal hash value and one of the first hash values in the verification data and the second hash value to generate the second root hash value comprises:
   serially concatenating the second hash value of the second electronic file with one of the first hash values in the verification data to generate a first string, and performing hash processing to the first string to generate a second non-terminal hash value; and
   serially concatenating the at least one first non-terminal hash value in the verification data with the second non-terminal hash value to produce a second string, and performing hash processing to the second string to produce the second root hash value.

2. The file verification method as claimed in claim 1, wherein the step of comparing the second root hash value with the first root hash value stored in the blockchain to verify the second electronic file comprises:
   determining whether the second root hash value is the same with the first root hash value;
   if yes, determining that the second electronic file passes the verification; and
   if not, determining that the second electronic file does not pass the verification.

3. The file verification method as claimed in claim 1, wherein the step of verifying the second electronic file according to the verification data comprises:
   obtaining the first root hash value from the blockchain according to the block information in the verification data.

4. The file verification method as claimed in claim 1, wherein the block information comprises a block height, a transaction ID and a time stamp.

5. The file verification method as claimed in claim 1, wherein the first electronic files are stored in a plurality of user end devices in a distributed manner, and the file verification method further comprises:
   collecting the first hash values within a predetermined time interval; and
   sending the verification data to one of the user end devices.

6. The file verification method as claimed in claim 1, wherein the step of establishing the tree data structure according to the first hash values of the first electronic files comprises:
   establishing a binary tree data structure according to the first hash values of the first electronic files and at least one redundant complement value.

7. The file verification method as claimed in claim 1, wherein the step of generating the verification data comprising the block information of the block, one of the first hash values and the at least one non-terminal hash value of the tree data structure for one of the first electronic files comprises:
   retrieving the at least one first non-terminal hash value from each one of at least one intermediate layer of the tree data structure according to a structure of the tree data structure, wherein the at least one first non-terminal hash value and the first hash value of one of the first electronic files are located on different branches of the tree data structure.

8. A file verification system, comprising:
   a memory, configured to store data;
   a communication interface, configured to connect a blockchain platform;
   one or a plurality of processors, coupled to the memory and the communication interface, and configured to:
   establish a tree data structure according to a plurality of first hash values of a plurality of first electronic files;
   store a first root hash value of the tree data structure into a block of a blockchain;

generate a verification data comprising block information of the block, one of the first hash values and at least one non-terminal hash value of the tree data structure for one of the first electronic files; and verify a second electronic file according to the verification data, wherein the processor is further configured to:

perform hash processing to the second electronic file to generate a second hash value;

perform hash processing according to the at least one first non-terminal hash value and one of the first hash values in the verification data and the second hash value to generate a second root hash value; and compare the second root hash value with the first root hash value stored in the blockchain to verify the second electronic file, wherein the processor is further configured to:

serially concatenate the second hash value of the second electronic file with one of the first hash values in the verification data to generate a first string, and perform hash processing to the first string to generate a second non-terminal hash value; and serially concatenate the at least one first non-terminal hash value in the verification data with the second non-terminal hash value to produce a second string, and perform hash processing to the second string to produce the second root hash value.

9. The file verification system as claimed in claim 8, wherein the processor is further configured to:

determine whether the second root hash value is the same with the first root hash value;

if yes, determine that the second electronic file passes the verification; and if not, determine that the second electronic file does not pass the verification.

10. The file verification system as claimed in claim 8, wherein the processor is further configured to:

obtain the first root hash value from the blockchain according to the block information in the verification data.

11. The file verification system as claimed in claim 8, wherein the block information comprises a block height, a transaction ID and a time stamp.

12. The file verification system as claimed in claim 8, wherein the processor is further configured to:

collect the first hash values within a predetermined time interval.

13. The file verification system as claimed in claim 8, wherein the processor is further configured to:

establish a binary tree data structure according to the first hash values of the first electronic files and at least one redundant complement value.

14. The file verification system as claimed in claim 8, wherein the processor is further configured to:

retrieve the at least one first non-terminal hash value from each one of at least one intermediate layer of the tree data structure according to a structure of the tree data structure, wherein the at least one first non-terminal hash value and the first hash value of one of the first electronic files are located on different branches of the tree data structure.

15. A file verification server, comprising:

a memory, configured to store data;

a communication interface, configured to connect a blockchain platform;

a processor, coupled to the memory and the communication interface, and configured to:

establish a tree data structure according to a plurality of first hash values of a plurality of first electronic files;

store a first root hash value of the tree data structure into a block of a blockchain; and generate a verification data comprising block information of the block, one of the first hash values and at least one non-terminal hash value of the tree data structure for one of the first electronic files, send the verification data to a user end device, such that the user end device verifies a second electronic file by using the verification data, wherein the processor is further configured to:

perform hash processing to the second electronic file to generate a second hash value;

perform hash processing according to the at least one first non-terminal hash value and one of the first hash values in the verification data and the second hash value to generate a second root hash value; and compare the second root hash value with the first root hash value stored in the blockchain to verify the second electronic file, wherein the processor is further configured to:

serially concatenate the second hash value of the second electronic file with one of the first hash values in the verification data to generate a first string, and perform hash processing to the first string to generate a second non-terminal hash value; and serially concatenate the at least one first non-terminal hash value in the verification data with the second non-terminal hash value to produce a second string, and perform hash processing to the second string to produce the second root hash value.

16. The file verification server as claimed in claim 15, wherein the processor is further configured to:

collect the first hash values within a predetermined time interval.

* * * * *